US011762101B2

(12) United States Patent
Hasegawa et al.

(10) Patent No.: US 11,762,101 B2
(45) Date of Patent: Sep. 19, 2023

(54) POSITION MEASUREMENT SYSTEM, POSITION MEASUREMENT METHOD, POSITION MEASUREMENT INSTRUCTION METHOD, RECORDING MEDIUM WITH POSITION MEASUREMENT INSTRUCTION PROGRAM RECORDED, AND VEHICLE CONTROL APPARATUS

(71) Applicant: HONDA MOTOR CO., LTD., Tokyo (JP)

(72) Inventors: Satoshi Hasegawa, Wako (JP); Seonghun Lee, Wako (JP); Katsuyasu Yamane, Wako (JP); Fumiaki Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 489 days.

(21) Appl. No.: 17/117,501

(22) Filed: Dec. 10, 2020

(65) Prior Publication Data

US 2021/0181356 A1    Jun. 17, 2021

(30) Foreign Application Priority Data

Dec. 17, 2019  (JP) ................................. 2019-226984

(51) Int. Cl.
*G01S 19/14* (2010.01)
*H04L 67/12* (2022.01)
*H04B 1/3827* (2015.01)

(52) U.S. Cl.
CPC ............ *G01S 19/14* (2013.01); *H04B 1/3827* (2013.01); *H04L 67/12* (2013.01)

(58) Field of Classification Search
CPC ........ G01S 19/14; H04B 1/3827; H04L 67/12
USPC ..................................................... 342/357.52
See application file for complete search history.

(56) References Cited

FOREIGN PATENT DOCUMENTS

| CN | 108368708 A | 8/2018 |
|----|-------------|--------|
| JP | 2014-054902 | 3/2014 |

OTHER PUBLICATIONS

Chinese Office Action, Application No. 202011465252 dated Jun. 28, 2022, with English translation, 19 pages.

*Primary Examiner* — Harry K Liu
(74) *Attorney, Agent, or Firm* — Rankin, Hill & Clark LLP

(57) ABSTRACT

A relative position of a mobile terminal with respect to a vehicle is measured. The mobile terminal includes a position-measurement-necessity determining unit and a position-measurement control unit, and the position-measurement-necessity determining unit determines whether it is necessary to measure the relative position depending on whether the mobile terminal is in a predetermined state when the mobile terminal enters from the outside to the inside of an out-vehicle communication area of a first vehicle communication unit. The position-measurement control unit causes a position measuring unit provided in the vehicle to measure the relative position when the position-measurement-necessity determining unit determines that it is necessary to measure the relative position.

13 Claims, 4 Drawing Sheets

POSITION MEASUREMENT SYSTEM, POSITION MEASUREMENT METHOD, POSITION MEASUREMENT INSTRUCTION METHOD, RECORDING MEDIUM WITH POSITION MEASUREMENT INSTRUCTION PROGRAM RECORDED, AND VEHICLE CONTROL APPARATUS

INCORPORATION BY REFERENCE

The present application claims priority under 35 U.S.C. § 119 to Japanese Patent Application No. 2019-226984 filed on Dec. 17, 2019. The content of the application is incorporated herein by reference in its entirety.

BACKGROUND OF THE INVENTION

Field of the Invention

The present invention relates to a position measurement system, a position measurement method, a position measurement instruction method, a recording medium with position measurement instruction program recorded, and a vehicle control apparatus.

Description of the Related Art

Conventionally, a vehicle control system has been proposed that includes a security device and an interior reader/writer in a vehicle and thus enables operations on the vehicle by using a vehicle key and a mobile terminal such as a smartphone (see Japanese Patent Laid-Open No. 2014-54902, for example). In the vehicle control system, the security device permits locking/unlocking of a door with a vehicle key if authentication of the vehicle key is succeeded within a communication area outside of the vehicle. The security device further permits to start an engine of the vehicle with the vehicle key if the authentication of the vehicle key is succeeded within a communication area within the vehicle.

The interior reader/writer permits operations on the vehicle (such as locking/unlocking of a door, and start of the engine) with a mobile terminal carried onto the vehicle if authentication via near field communication (NFC) with the mobile terminal is succeeded.

Although the operations on a vehicle with a mobile terminal are enabled when the mobile terminal is carried onto the vehicle in the conventional vehicle control system, enabling operations of the vehicle from outside of the vehicle with the mobile terminal like a vehicle key is also desired. In the vehicle key, combination of low-frequency (LF) and ultra-high frequency (UHF) makes it possible, with relatively low power consumption, to detect the relative position of the vehicle key with respect to the vehicle, and to permit the operations of the vehicle with the vehicle key. Therefore, also in a case of enabling a smartphone to operate the vehicle from outside of the vehicle, it is desirable chat the power consumption can be reduced to detect the smartphone position.

The present invention has been made in view of this background, and an object of the present invention is to provide a position measurement system, a position measurement method, a position measurement instruction method, a recording medium with position measurement Instruction program recorded, and a vehicle control apparatus, capable of measuring the relative position of a mobile terminal with respect to a vehicle while reducing power consumption.

SUMMARY OF THE INVENTION

As a first aspect for achieving the above object, there is provided a position measurement system that includes a vehicle and a mobile terminal used by a user of the vehicle, and that measures a relative position of the mobile terminal with respect to the vehicle for remote operation of the vehicle with the mobile terminal, the vehicle having a vehicle communication unit and a position measuring unit, the vehicle communication unit communicating with the mobile terminal, the position measuring unit measuring the relative position, the system including: a position-measurement-necessity determining unit that determines whether it is necessary to measure the relative position depending on whether the mobile terminal is in a predetermined state when the mobile terminal positions within an out-vehicle communication area of the vehicle communication unit; and a position-measurement control unit that causes the position measuring unit to measure the relative position when the position-measurement-necessity determining unit determines that it is necessary to measure the relative position.

The position measurement, system may be configured such that; the position-measurement-necessity determining unit and the position-measurement control unit are provided in the mobile terminal; and the position-measurement control unit transmits position measurement instruction information to the vehicle communication unit to cause the position measuring unit to measure the relative position, the position measurement instruction information giving an instruction to measure the relative position.

The position measurement system may be configured such that: the position-measurement-necessity determining unit and the position-measurement control unit are provided in the vehicle; the mobile terminal transmits terminal state information to the vehicle communication unit, the terminal state information indicating a state of the mobile terminal; and the position-measurement-necessity determining unit recognizes whether the mobile terminal is in the predetermined state based on the terminal state information received via the vehicle communication unit.

The position measurement system may be configured such that: the mobile terminal has a terminal lock control unit, the terminal lock control unit switching from a locked state to an unlocked state in response to a predetermined unlocking operation, the locked state being a state in which the mobile terminal cannot be operated, the unlocked state being a state in which the mobile terminal can be operated; the predetermined state is the locked state; and the position-measurement-necessity determining unit determines that it is necessary to measure the relative position when the mobile terminal is in the locked state.

The position measurement system may be configured such that: the mobile terminal has an operation-existence/nonexistence recognizing unit, the operation-existence/nonexistence recognizing unit recognizing whether the mobile terminal is being operated; the predetermined state is a non-operation state in which a situation continues for a predetermined time or longer, the situation being a situation in which the mobile terminal is recognized by the operation-existence/nonexistence recognizing unit as not being operated; and the position-measurement-necessity determining unit determines that it is necessary to measure the relative position when the mobile terminal is in the non-operation state.

The position measurement system may be configured such that: the predetermined state is an electronic-key-application operating state in which an electronic key application (app) is in operation in the mobile terminal, the electronic key app causing the mobile terminal to function as an electronic key including a remote operation function of the vehicle; and the position-measurement-necessity determining unit determines that it is necessary to measure the relative position when the mobile terminal is in the electronic-key-application operating state.

The position measurement system may be configured such that: the mobile terminal has a charging-existence/nonexistence recognizing unit, the charging-existence/nonexistence recognizing unit recognizing whether the mobile terminal is being charged; the predetermined state is a charging-existence state in which the mobile terminal is recognized by the charging-existence/nonexistence recognizing unit as being charged; and the position-measurement-necessity determining unit determines that it is unnecessary to measure the relative position when the mobile terminal is in the charging-existence state.

The position measurement system may be configured such that: the mobile terminal has a current position detecting unit, the current position detecting unit detecting a current position of the mobile terminal, the position measurement system includes an indoor-location recognizing unit that recognizes whether the mobile terminal positions Indoors based on the current position of the mobile terminal detected by the current position detecting unit, wherein: the predetermined state is an indoor-charging state, the indoor-charging state being a state in which the mobile terminal is recognized by the charging-existence/nonexistence recognizing unit as being charged and the mobile terminal is recognized by the indoor-location recognizing unit as being located indoors; and the position-measurement-necessity determining unit determines that it is unnecessary to measure the relative position when the mobile terminal is in the indoor-charging state.

The position measurement system may be configured such that: the mobile terminal has a motion sensor, the motion sensor detecting a position-change of the mobile terminal, the position measurement system includes a position-change-existence/nonexistence recognizing unit that recognizes whether the mobile terminal is changed in position based on a detection status of the motion sensor wherein: the predetermined state is a non-position-change state, the non-position-change state being a state in which the mobile terminal is recognized by the position-change-existence/nonexistence recognizing unit as not being changed in position; and the position-measurement-necessity determining unit determines that it is unnecessary to measure the relative position when the mobile terminal, is in the non-position-change state.

Next, as a second aspect for achieving the above object, there is provided a position measurement method that measures a relative position of a mobile terminal with respect to a vehicle for remote operation of the vehicle with the mobile terminal, the mobile terminal being used by a user of the vehicle to communicate with the vehicle, the method, including: a position-measurement-necessity determination step of determining whether it is necessary to measure the relative position depending on whether the mobile terminal is in a predetermined state when the mobile terminal positions within an out-vehicle communication area of a vehicle communication unit, the vehicle communication unit being provided in the vehicle; and a position measurement control step of causing a position measuring unit to measure the relative position when the position-measurement-necessity determination step determines that it is necessary to measure the relative position, the position measuring unit being provided in the vehicle.

Next, as a third aspect for achieving the above object, there is provided a position measurement instruction method that instructs a vehicle to measure a relative position of a mobile terminal with respect to the vehicle for remote operation of the vehicle with the mobile terminal., the method being executed by the mobile terminal, the mobile terminal being used by a user of the vehicle to communicate with the vehicle, the method including: a position-measurement-necessity determination step of determining whether it is necessary to measure the relative position depending on whether the mobile terminal is in a predetermined state when the mobile terminal positions within an out-vehicle communication area of a vehicle communication unit, the vehicle communication unit being provided in the vehicle; and a relative position measurement control step of transmitting position measurement instruction information to the vehicle communication unit when the position-measurement-necessity determination step determines that it is necessary to measure the relative position, the position measurement instruction information giving an instruction to measure the relative position.

Next, as a fourth aspect for achieving the above object, there is provided a recording medium with position measurement instruction program recorded, the program instructs a vehicle to measure a relative position of a mobile terminal with respect to the vehicle for remote operation of the vehicle with the mobile terminal and the program is executed by a processor provided in the mobile terminal, the mobile terminal being used by a user of the vehicle to communicate with the vehicle, the program causing the processor to function as: a position-measurement-necessity determining unit that determines whether it is necessary to measure a relative position of the mobile terminal with respect to the vehicle, for enabling remote operation of the vehicle with the mobile terminal, depending on whether the mobile terminal is in a predetermined state when the mobile terminal positions within an out-vehicle communication area of a vehicle communication unit, the vehicle communication unit being provided in the vehicle; and a position-measurement control unit that transmits position measurement instruction information to the vehicle communication unit when the position-measurement-necessity determining unit determines that it is necessary to measure the relative position, the position measurement instruction information giving an instruction to measure the relative position.

Next, as a fifth aspect for achieving the above object, there is provided a vehicle control apparatus, Including: a vehicle communication control unit that controls communication of a vehicle communication unit, the vehicle communication unit communicating with a mobile terminal used by a vehicle user; a position measuring unit that measures a relative position of the mobile terminal with respect to the vehicle; a position-measurement-necessity determining unit that receives terminal state information using the vehicle communication control unit via the vehicle communication unit, recognizes whether the mobile terminal is in a predetermined state based on the terminal state information and determines whether to measure the relative position depending on whether the mobile terminal is in the predetermined state, when the vehicle communication control unit recognizes that the mobile terminal positions within an out-vehicle communication area of the vehicle communication unit, the terminal state information indicating a state of the mobile terminal and being transmitted from the mobile terminal; and a position-measurement control unit that causes the position measuring unit to measure the relative position when the position-measurement-necessity determining unit determines that it is necessary to measure the relative position.

According to the position measurement system of the present invention, when the mobile terminal positions within the out-vehicle communication area of the vehicle communication unit, the position-measurement-necessity determining unit determines whether it is necessary to measure the relative position of the mobile terminal with respect to the vehicle depending on whether the mobile terminal is in the predetermined state. Then, when the position-measurement-necessity determining unit determines that it is necessary to measure the relative position, the position-measurement control unit causes the position measuring unit to measure the relative position. This can reduce the power consumption as compared with a case where the position measuring unit unconditionally measures the relative position of the mobile terminal with respect to the vehicle when the mobile terminal positions within the out-vehicle communication area of the vehicle communication unit.

DETAILED DESCRIPTION OF THE PREFERRED EMBODIMENTS

1. Measurement of Mobile Terminal Position by Position Measurement System

Figure 1:
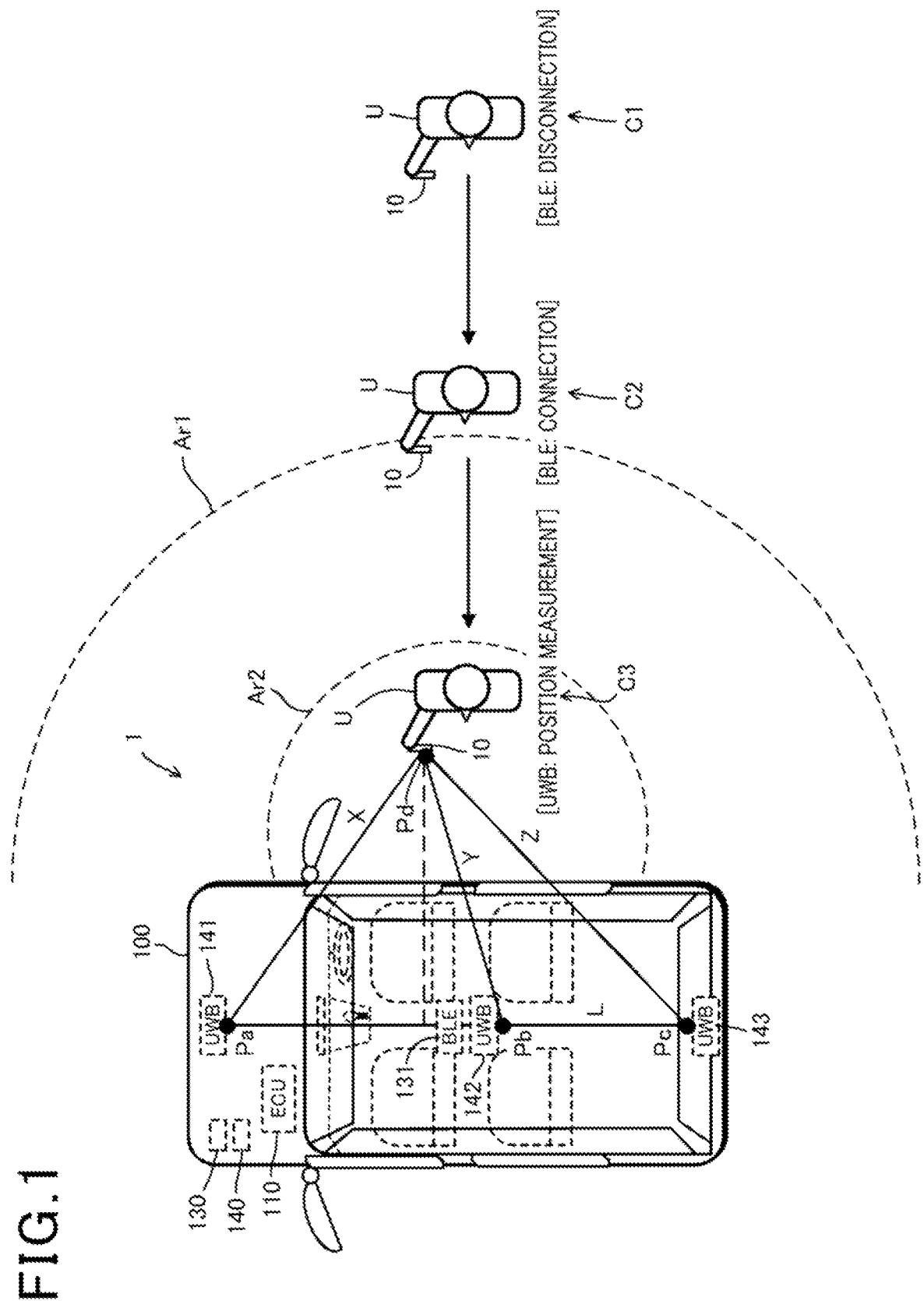
FIG. 1 is an explanatory diagram of an aspect in which a position measurement system measures a relative position of a mobile terminal with respect to a vehicle.

An aspect of measuring a relative position Pd of a mobile terminal 10 with respect to a vehicle 100 in a position measurement system 1 of an embodiment is described below with reference to FIG. 1. The position measurement system 1 includes the vehicle 100 and the mobile terminal 10 used by a user U of the vehicle 100. The position measurement system 1 measures the relative position Pd of the mobile terminal 10 with respect to the vehicle 100 in order to permit the mobile terminal 10 to remotely operate the vehicle 100. The mobile terminal 10 is, for example, a wearable device such as a smartphone, a mobile phone, a tablet terminal, or a smart watch, and is carried or worn by the user U.

An electronic key application (app) is installed in the mobile terminal 10, and the mobile terminal 10 can function as an electronic key including a remote operation function of the vehicle 100 by executing the electronic key app. The vehicle 100 and the mobile terminal 10 communicate with each other according to the communication specifications of Bluetooth Low Energy (BLE where Bluetooth is a registered trademark) and Ultra wide Band (UWB). UWB communication uses a bandwidth of 500 MHz to ten-odd GHz (for example, around an 8 GHz band). The vehicle 100 includes: an Electronic Control Unit (ECU, corresponding to a vehicle control apparatus of the present invention) 100 that controls the operation of the vehicle 100; a first vehicle communication unit 130 (corresponding to a vehicle communication unit of the present invention) that communicates according to BLE; and a second vehicle communication unit 140 that communicates according to UWB.

The vehicle 100 has a ELS antenna 131 connected to the first vehicle communication unit 130 and UWB antennas 141, 142 and 143 connected to the second vehicle communication unit 140. The BLE antenna 131 is arranged substantially in a center part of the vehicle 100. The UWB antenna 141 is arranged in a front part of the vehicle 100, the UWB antenna 142 is arranged in the center part, and the UWB antenna 143 is arranged in a rear part of the vehicle 100.

The ECU 110 polls by BLE communication via the first vehicle communication unit 130, and establishes BLE communication with the mobile terminal 10 within the out-vehicle communication area Ar1 when the mobile terminal 10 enters from the outside C1 state) to the inside (C2 state) of an out-vehicle communication area Ar1 of the BLE communication by the first vehicle communication unit 130.

Then, the ECU 110 makes authentication of an electronic key with the mobile terminal 10 to confirm that the mobile terminal 10 is registered as an electronic key of the vehicle 100. More specifically, the ECU 110 compares the authentication code transmitted from the mobile terminal 10 with the authentication code saved in the memory of the ECU 110 to confirm that the mobile terminal 10 is registered as the electronic key of the vehicle 100. Then, in order to permit the use of the mobile terminal 10 as an electronic key depending on whether the mobile terminal 10 is in a predetermined state to be described below, it is determined whether it is necessary to measure the relative position Pd of the mobile terminal 10 with respect to the vehicle 100.

When the ECU 110 determines that it is necessary to measure the relative position Pd, it performs UWB communication with the mobile terminal 10 via the second vehicle communication unit 140 to measure a distance X between the UWB antenna 141 and the mobile terminal 10, a distance Y between the UWB antenna 142 and the mobile terminal 10, and a distance Z between the UWB antenna 143 and the mobile terminal 10, based on the Time of Flight (ToF). Since the position Pa of the UWB antenna 141, the position Pb of the UWB antenna 142, and the position Pc of the UWB antenna 143 in the vehicle 100 are known, measuring X, Y, and Z enables calculating the relative position Pd of the mobile terminal 10 with respect to the vehicle 100 by trilateration.

When the ECU 110 determines that it is necessary to measure the relative position Pd, the ECU 110 repeatedly measures the relative position Pd, and when the ECU 110 recognizes that the mobile terminal 10 enters a monitoring area Ar2 near the vehicle 100, the ECU 110 permits the mobile terminal to be used as the electronic key. This enables the user U to operate the mobile terminal 10 to unlock and lock the door of the vehicle 100, to open and close an electric door (such as a power slide door, a power hinge door, or a power tail gate), to start the engine, to turn on and off an air conditioner, to cause a buzzer to go off, or the like. Further, the ECU 110 performs process such as putting on a welcome light (not shown) provided in the vehicle 100.

2. Configuration of Mobile Terminal

The configuration of the mobile terminal 10 is described below with reference to FIG. 2. The mobile terminal 10 includes a processor 20, a memory 50 (recording medium), a first mobile communication unit 40, a second mobile communication unit 41, a touch panel 42, a button switch 43, a microphone 44, a speaker 45, a motion sensor 46, and a Global Positioning System (GPS) sensor 47 (corresponding to a current position detecting unit of the present invention).

As described above, the first mobile communication unit 40 performs 3LE communication, and the second mobile communication unit 41 performs UWS communication. The touch panel 42 is configured such that a flat type display unit such as a liquid crystal panel has touch sensors arranged on the surface thereof, a detection signal of the touch sensor is input to the processor 20 according to the operation of the user U, and the screen display of the display unit is controlled in response to a display control signal from the processor 20.

The button switch 43 inputs an operation signal corresponding to the operation of the user U, to the processor 20. The microphone 44 inputs a sound such as the voice of the user U to input a sound signal to the processor 20. The speaker 45 outputs a notification sound or the like in response to a sound output control signal from the processor 20. The motion sensor 46 is configured with an acceleration sensor or an angular velocity sensor, and detects the position-change of the mobile terminal 10. The GPS sensor 47 receives a signal transmitted from a GPS satellite to detect the current position of the mobile terminal 10.

The memory 50 saves a program for control 51 of the mobile terminal 10 and a program of the electronic key app (electronic-key-application program) 52. The processor 20 reads and executes the program for control 51 to function as a mobile communication control unit 21, a terminal lock control unit 22, an operation-existence/nonexistence recognizing unit 23, a charging-existence/nonexistence recognizing unit 24, and a position-change-existence/nonexistence recognizing unit 25.

The mobile communication control unit 21 controls BLE communication via the first mobile communication unit 40, and also controls UWB communication via the second mobile communication unit 41. The terminal lock control unit 22 switches the mobile terminal 10 between an unlocked state in which the operation by the user U is accepted and a locked state in which the operation other than unlocking by the user U is inhibited. The terminal lock control unit 22 turns the mobile terminal 10 to be in locked state when a state in which the user U does not operate the mobile terminal 10 continues for a first predetermined time or longer. Further, the terminal lock control unit 22 switches from the locked state to the unlocked state when there is an unlocking operation by the user U in the locked state. As the unlocking operation. Personal Identification Number (PIN) input, fingerprint authentication, face authentication, or the like is adopted.

The operation-existence/nonexistence recognizing unit 23 detects whether the user U has operated the touch panel 42, the button switch 43, the voice input to the microphone 44, or the like. The position-change-existence/nonexistence recognizing unit 25 recognizes whether the mobile terminal 10 is changed in position based on the detection signal of the motion sensor 46. The charging-existence/nonexistence recognizing unit 24 recognizes whether the battery (not shown) provided in the mobile terminal 10 is being charged based on, for example, the detection status of the charging current of the battery with a current sensor (not shown) provided in the mobile terminal 10.

Further, the processor 20 reads and executes the electronic-key-application program 52 to function as an indoor-location recognizing unit 26, a position-measurement-necessity determining unit 27, a position-measurement control unit 28, and a mobile electronic-key control unit 29. The process executed by the position-measurement-necessity determining unit 27 corresponds to a position-measurement-necessity determination step in a position measurement method and a position measurement instruction method of the present invention. The process executed by the position-measurement control unit 28 corresponds to a position measurement control step in the position measurement method and the position measurement instruction method of the present invention. Further, the electronic-key-application program 52 includes a position measurement instruction program of the present invention. The electronic-key-application program 52 may be recorded in an external recording medium (flash memory, magnetic disk, optical disk or the like), and transferred from the external recording medium to the memory 50.

The indoor-location recognizing unit 26 determines whether the mobile terminal 10 positions indoors based on the current position of the mobile terminal 10 detected by the GPS sensor 47 and a nap data 53. The indoor-location recognizing unit 26 recognizes that the mobile terminal 10 positions indoors, for example, when the current position of the mobile terminal 10 is within a radius of several meters (for example, 5 m) from the reference position of the building in the map data 53. Alternatively, the Indoor-location recognizing unit 26 recognizes that the mobile terminal 10 positions indoors when the current position of the mobile terminal 10 is within the region surrounded by the outer frame of the building in the map data 53.

The position-measurement-necessity determining unit 27 determines whether the mobile terminal 10 is in the following first predetermined state to fifth predetermined state, in a state in which BLE communication has been established with the vehicle 100 (a state in which the mobile terminal 10 positions within the cut-vehicle communication area Ar1 of BLE communication by the first vehicle communication unit 130).

Then, when the mobile terminal 10 is in at least one of the following first predetermined state to third predetermined state (position-measurement-necessary state), the position-measurement-necessity determining unit 27 determines that it is necessary to measure the relative position Pd of the mobile terminal 10 with respect to the vehicle 100.

First predetermined state: A state in which the mobile terminal 10 is in the locked state. Since the mobile terminal 10 is not operated when the mobile terminal 10 is in the locked state, it is presumed that the user U has approached the vehicle 100 in order to use the vehicle 100.

Second predetermined state: A state in which a state, In which the operation-existence/nonexistence recognizing unit 23 does not recognize the operation, continues for a second predetermined time (corresponding to a predetermined time of the present invention) or longer (non-operation state). Since the mobile terminal 10 is not operated, it is presumed that the user U has approached the vehicle 100 in order to use the vehicle 100.

Third predetermined state: The state in which the electronic key app is in operation (electronic-key-application operating state). When the mobile terminal 10 is in the electronic-key-application operating state, it is presumed that the user U has caused the electronic key app to be in operation in order to use the vehicle 100.

Further, when the mobile terminal 10 is in at least one of the following fourth predetermined state and fifth predetermined state (position-measurement-unnecessary state), the position-measurement-necessity determining unit 27 determines that it is unnecessary to measure the relative position Pd of the mobile terminal 10 with respect to the vehicle 100.

Fourth predetermined state: A state in which the position-change-existence/nonexistence recognizing unit 25 does not recognize that the mobile terminal 10 is changed in position (non-position-change state). When the mobile terminal 10 is not changed in position, it is presumed that the user U is not in a situation of carrying the mobile terminal 10 and approaching the vehicle 100 in order to use the vehicle 100.

Fifth predetermined state: A state in which the charging-existence/nonexistence recognizing unit 24 recognizes that the mobile terminal 10 is being charged, and the indoor-location recognizing unit 26 recognizes that the mobile terminal 10 positions indoors (indoor-charging state). When the mobile terminal 10 is in the indoor-charging state, it is presumed that the mobile terminal 10 is not in a situation of being used as an electronic key. For example, such a situation comes when the vehicle 100 is parked near the house and the mobile terminal 10 is being charged inside the house within the out-vehicle communication area Ar1 of the first vehicle communication unit 130.

Note that, when the charging-existence/nonexistence recognizing unit 24 recognizes that the mobile terminal 10 is being charged, it is presumed that there is a high possibility that the mobile terminal 10 is charged indoors, and that the user U is not in a situation to use the mobile terminal 10 as an electronic key. Therefore, the indoor-location recognizing unit 26 may be omitted, and when the mobile terminal 10 is recognized as being charged by the charging-existence/nonexistence recognizing unit 24 (charged state), the position-measurement-necessity determining unit 27 may determine that it is unnecessary to measure the relative position Pd of the mobile terminal 10 with respect to the vehicle 100.

The position-measurement control unit 20 transmits the position measurement instruction information Pmr giving an instruction to measure the relative position Pd, to the first vehicle communication unit 130, when the position-measurement-necessity determining unit 27 determines that it is necessary to measure the relative position Pd of the mobile terminal 10 with respect to the vehicle 100. The mobile electronic-key control unit 29 transmits remote operation instruction information giving an instruction for remote operation of the vehicle 100, to the first vehicle communication unit 130.

3. Configuration of Vehicle

The configuration of the vehicle 100 is described below with reference to FIG. 3. The vehicle 100 includes a door lock mechanism 150, a power window 151, an electric door 152 (such as a power slide door, a power hinge door, or a power tail gate), an air conditioner 153, an engine starting unit 154, and a speaker 155, in addition to the ECU 210, the first vehicle communication unit 130, and the second vehicle communication unit 140.

The ECU 110 is a control unit configured with a Central Processing Unit (CPU (not shown)), a memory 120, and the like. The CPU reads and executes a program for control 121 of the vehicle 100 saved in the memory 120 to function as a vehicle communication control unit 111, a position measuring unit 112, and a vehicle electronic-key control unit 113.

The vehicle communication control unit 111 controls BLE communication via the first vehicle communication unit 130, and controls UWB communication via the second vehicle communication unit 140. When the position measuring unit 112 receives the position measurement instruction information Pmr from the mobile terminal 10 via the first vehicle communication unit 130, as described above with reference to FIG. 1, the position measuring unit 112 performs UKB communication with the mobile terminal 10 via the second vehicle communication unit 140 to measure the relative position Pd of the mobile terminal 10 with respect to the vehicle 100.

The vehicle electronic-key control unit 113 performs the above-mentioned electronic key authentication process with the mobile electronic-key control unit 29 of the mobile terminal 10 to permit the mobile terminal 10 to remotely operate the vehicle 100. Then, when the vehicle electronic-key control unit 113 receives the remote operation instruction information transmitted from the mobile terminal 10, the vehicle electronic-key control unit 113 controls the operation of the vehicle 100 according to the instruction details of the remote operation instruction information.

The remote operation instruction information instructs the door lock mechanism 150, the power window 151, the electric door 152, the air conditioner 153, the engine starting unit 154, the speaker 155, and the like to operate.

4. Measuring Process of Relative Position of Mobile Terminal with Respect to Vehicle A series of processes for calculating the relative position Pd of the mobile terminal 10 with respect to the vehicle 100 is described below with reference to the flowchart shown in FIG. 4.

Figure 4:
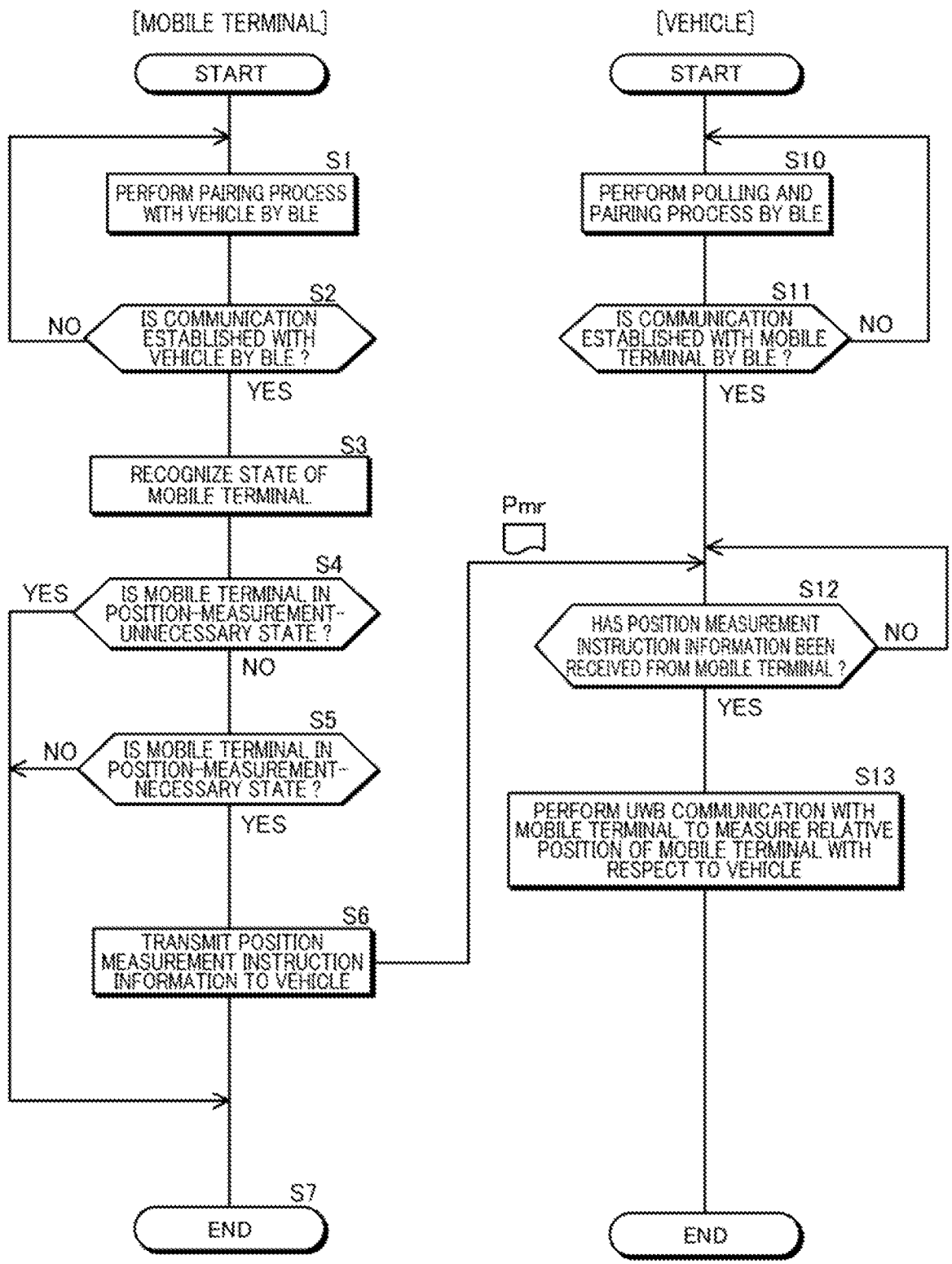
FIG. 4 is a flowchart cf a process of communicating between a mobile terminal and a vehicle and measuring the relative position of the mobile terminal with respect to the vehicle.

In step S10 of FIG. 4, the vehicle communication control unit ill of the vehicle 100 performs polling by BLE communication covering within the out-vehicle communication area Ar1 via the first vehicle communication unit 130. The vehicle communication control unit 111 transmits a polling signal via the first vehicle communication unit 130 and receives a response signal transmitted from the mobile terminal 10 that has received the polling signal via the first vehicle communication unit 130, to detect the mobile terminal 10 and make pairing with the mobile terminal 10. In the following step 311, the vehicle communication control unit 111 advances the process to step S12 when BLE communication with the mobile terminal 10 is established by pairing.

On the other hand, in step S1 of FIG. 4, when the mobile communication control unit 21 in the mobile terminal 10 receives the polling signal transmitted from the vehicle 100 via the first mobile communication unit 40, the mobile communication control unit 21 transmits a response signal to the vehicle 100 via the first mobile communication unit 40. In this way, the mobile communication control unit 21 makes pairing with the vehicle 100. In the following step S2, the mobile communication control unit 21 advances the process to step S3 when BLE communication with the vehicle 100 is established by pairing, Note that, a pairing procedure may be such that the mobile terminal 10 side transmits the polling signal, and then the mobile terminal 10 receives the response signal transmitted from the vehicle 100 that has received the polling signal, to pair the vehicle 100 with the mobile terminal 10.

As described above, when the mobile terminal 10 enters the out-vehicle communication area Ar1 of the BLE communication by the first vehicle communication unit 130 of the vehicle 100 through the processes of steps S10 to S11 and steps S1 to S2, the BLE communication is established between the vehicle 100 and the mobile terminal 10.

In step S3, the position-measurement-necessity determining unit 27 recognizes whether the mobile terminal 10 is in any one of the first predetermined state to the fifth predetermined state. In the next step S4, the position-measurement-necessity determining unit 27 determines whether the mobile terminal 10 is in a position-measurement-unnecessary state (a state of at least one of the fourth predetermined state and the fifth predetermined state).

Then, when the mobile terminal 10 is in a position-measurement-unnecessary state, the position-measurement-necessity determining unit 27 advances the process to step S7. In this case, the position measurement instruction information Pmr is not transmitted to the vehicle 100. On the other hand, when the mobile terminal 10 is not in the position-measurement-unnecessary state, the position-measurement-necessity determining unit 27 advances the process to step S5 to determine whether the mobile terminal 10 is in a position-measurement-necessary state (a state of at least one of the first predetermined state to the third predetermined state). Then, when the mobile terminal 10 is in the position-measurement-necessary state, the position-measurement-necessity determining unit 27 advances the process to step S6.

In step S6, the position-measurement control unit 28 transmits the position measurement instruction Information Pmr to the vehicle 100. When the position measuring unit 112 of the vehicle 100 receives the position measurement, instruction information Pmr from the mobile terminal 10 in step S12, the position measuring unit 112 advances the process to step S13, and as described above, performs UWB communication with the mobile terminal 10 to measure the relative position Pd of the mobile terminal 10 with respect to the vehicle 100.

On the other hand, when the mobile terminal 10 is not in the position-measurement-necessary state, the position-measurement-necessity determining unit 27 advances the process from step S5 to step S7, and in this case, the position measurement instruction information Pmr is not transmitted to the vehicle 100. Therefore, in the vehicle 100, the position measuring unit 112 does not measure the relative position Pd of the mobile terminal 10 with respect to the vehicle 100.

According to the process in the flowchart of FIG. A, when the mobile terminal 10 positions within the out-vehicle communication area Ar1 of the first vehicle communication unit 130 of the vehicle 100, it is determined whether to measure the relative position Pd of the mobile terminal 10 with respect to the vehicle 100 depending on the state of the mobile terminal 10. This can reduce the power consumption of the vehicle 100 required for the measurement of the relative position Pd as compared with a case where the relative position Pd is measured unconditionally.

5. Other Embodiments

In the above-mentioned embodiments, the position-measurement-necessity determining unit 27 and the position-measurement control unit 28 are provided in the mobile terminal 10, but the position-measurement-necessity determining unit 27 and the position-measurement control unit 28 may be provided in the vehicle 100. In this case, the configuration may be such that: the mobile terminal 10 transmits the terminal state Information indicating the state of the mobile terminal 10, to the vehicle 100; and the position-measurement-necessity determining unit 27 determines whether the mobile terminal 10 is in the predetermined state based on the terminal state information.

In the above embodiment, the position-measurement-necessity determining unit 27 determines whether the mobile terminal 10 is in above-mentioned first predetermined state to the fifth predetermined state, but the position-measurement-necessity determining unit 27 may determine whether the mobile terminal 10 is in at least one of the first predetermined state to the fifth predetermined state, instead of all of the first predetermined state to the fifth predetermined state.

In the above embodiment, the position measuring unit 112 provided in the vehicle 100 performs UWB communication with the mobile terminal 10 via the second vehicle communication unit 140 to measure the relative position Pd of the mobile terminal 10 with respect to the vehicle 100, but alternative method may be used to measure the relative position Pd. Also, in this case, determination whether to measure the relative position Pd depending on the state of the mobile terminal 10 can reduce the power consumption of the vehicle 100 required for the measurement of the relative position Pd as compared with a case where the relative position Pd is measured unconditionally.

Figure 2:
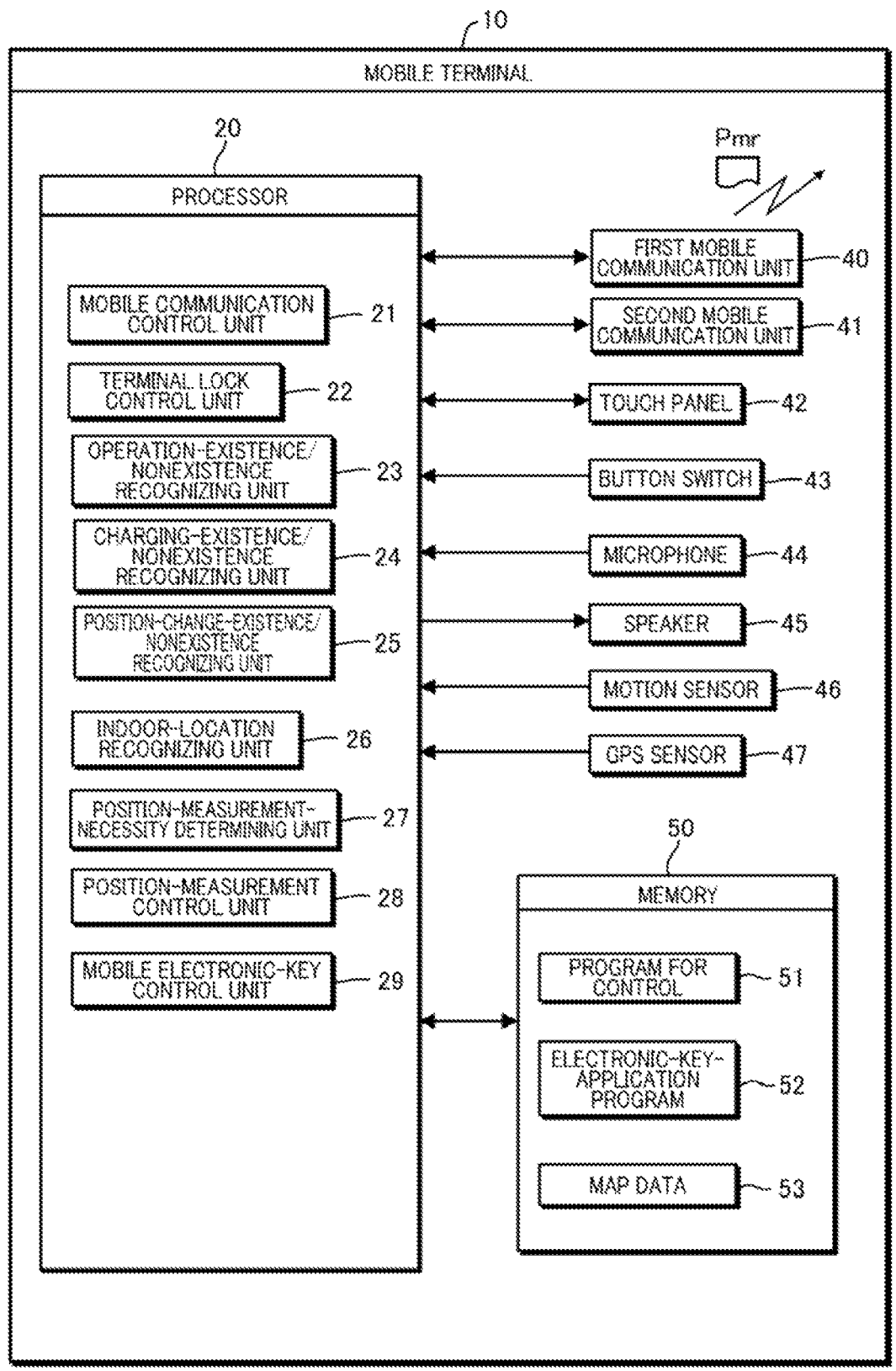
FIG. 2 is a configuration diagram of a mobile terminal.
Figure 3:
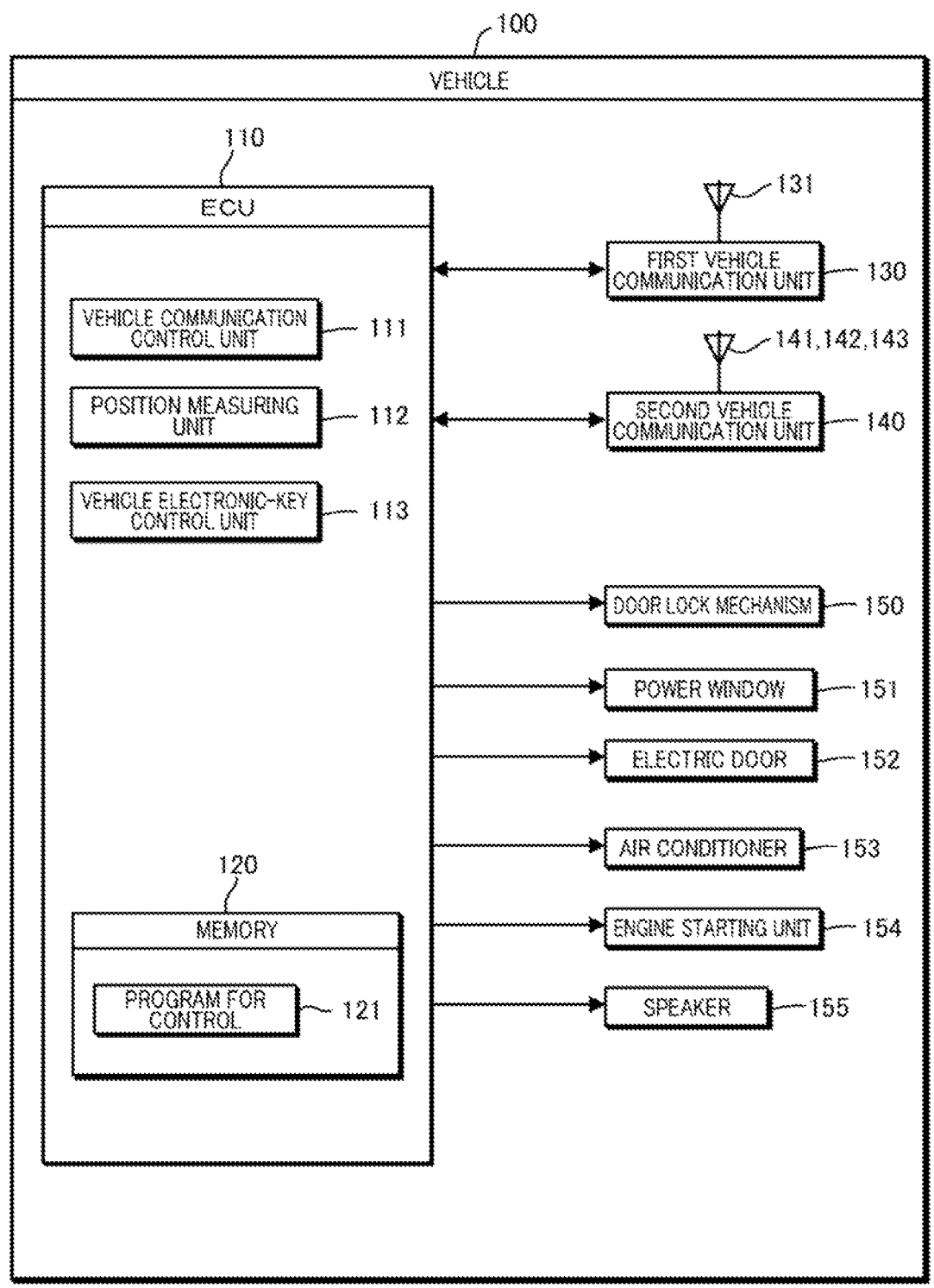
FIG. 3 is a configuration diagram of a vehicle.

Note that FIGS. 2 and 3 are schematic diagrams showing the configurations of the mobile terminal 10 and the vehicle 100 divided according to the main processing details in order to facilitate the understanding of the present invention of the subject application, but the configuration of the mobile terminal 10 and the vehicle 100 may be made with alternative divisions. Further, the process of each constituent element may be executed by one hardware unit, or may be executed by a plurality of hardware units. Further, the process by each constituent element shown in FIG. 4 may be executed by one program or may be executed by a plurality of programs.

6. Configuration Supported by the Above Embodiments

The above embodiments are specific examples of the following configuration.

(1) A position measurement system that includes a vehicle and a mobile terminal used by a user of the vehicle, and that measures a relative position of the mobile terminal with respect to the vehicle for remote operation of the vehicle with the mobile terminal, the vehicle having a vehicle communication unit and a position measuring unit, the vehicle communication unit communicating with the mobile terminal, the position measuring unit measuring the relative position, the system, including: a position-measurement-necessity determining unit that determines whether it is necessary to measure the relative position depending on whether the mobile terminal is in a predetermined state when the mobile terminal positions within an out-vehicle communication area of the vehicle communication unit; and a position-measurement control unit that causes the position measuring unit to measure the relative position when the position-measurement-necessity determining unit determines that it is necessary to measure the relative position.

According to the position measurement system under (1), when the mobile terminal positions within the out-vehicle communication area of the vehicle communication unit, the position-measurement-necessity determining unit determines whether it is necessary to measure the relative position of the mobile terminal with respect to the vehicle depending on whether the mobile terminal is in the predetermined state, then, when the position-measurement-necessity determining unit determines that it is necessary to measure the relative position, the position-measurement control unit causes the position measuring unit to measure the relative position. This can reduce the power consumption as compared with a case where the position measuring unit unconditionally measures the relative position of the mobile terminal with respect to the vehicle when the mobile terminal positions within the out-vehicle communication area of the vehicle communication unit.

(2) The position measurement system according to (1), wherein: the position-measurement-necessity determining unit and the position-measurement control unit are provided in the mobile terminal; and the position-measurement control unit transmits position measurement instruction information to the vehicle communication unit to cause the position measuring unit to measure the relative position, the position measurement instruction information giving an instruction to measure the relative position.

According to the position measurement system under (2), the mobile terminal side determines necessity of measuring the relative position of the mobile terminal with respect to the vehicle, which can reduce the processing load on the vehicle side involved by the measurement of the relative position. In addition, this can make it unnecessary to transmit information indicating the state of the mobile terminal from the mobile terminal to the vehicle, to decrease the amount of communication between the mobile terminal and the vehicle.

(3) The position measurement system according to (1), wherein: the position-measurement-necessity determining unit and the position-measurement control unit are provided in the vehicle; the mobile terminal transmits terminal state information to the vehicle communication unit, the terminal state information indicating a state of the mobile terminal; and the position-measurement-necessity determining unit recognizes whether the mobile terminal is in the predetermined state based on the terminal state information received via the vehicle communication unit.

According to the position measurement system under (3), the vehicle side determines necessity of measuring the relative position of the mobile terminal with respect to the vehicle, which can reduce the processing load on the mobile terminal side involved by the measurement of the relative position.

(4) The position measurement system according to any one of (1) to (3), wherein: the mobile terminal has a terminal lock control unit the terminal lock control unit switching from a locked state to an unlocked state in response to a predetermined unlocking operation, the locked state being a state in which the mobile terminal cannot be operated, the unlocked state being a state in which the mobile terminal can be operated; the predetermined state is the locked state; and the position-measurement-necessity determining unit determines that it is necessary to measure the relative position when the mobile terminal is in the locked state.

According to the position measurement system under (4), when the mobile terminal positions near the vehicle in the locked state, the system can presume that there is a high possibility that the user uses the vehicle, and the system can measure the relative position of the mobile terminal with respect to the vehicle.

(5) The position measurement system according to any one of (1) to (4), wherein: the mobile terminal has an operation-existence/nonexistence recognizing unit, the operation-existence/nonexistence recognizing unit recognizing whether the mobile terminal is being operated; the predetermined state is a non-operation state in which a situation continues for a predetermined time or longer, the situation being a situation in which the mobile terminal is recognized by the operation-existence/nonexistence recognizing unit as not being operated; and the position-measurement-necessity determining unit determines that it is necessary to measure the relative position when the mobile terminal is in the non-operation state.

According to the position measurement system under (5), when the mobile terminal positions near the vehicle In the non-operation state, the system can presume that there is a high possibility that the user uses the vehicle, and the system can measure the relative position of the mobile terminal with respect to the vehicle.

(6) The position measurement system according to any one of (1) to (5), wherein: the predetermined state is an electronic-key-application operating state in which an electronic key application (app) is in operation in the mobile terminal, the electronic key app causing the mobile terminal to function as an electronic key Including a remote operation function of the vehicle; and the position-measurement-necessity determining unit determines that it is necessary to measure the relative position when the mobile terminal is in the electronic-key-application operating state.

According to the position measurement system under (6), when the mobile terminal positions near the vehicle in the mobile terminal in the electronic-key-application operating state, the system can presume that there is a high possibility that the user uses the vehicle, and the system can measure the relative position of the mobile terminal with respect to the vehicle.

(7) The position measurement system according to any one of (1) to (6), wherein: the mobile terminal has a charging-existence/nonexistence recognizing unit, the charging-existence/nonexistence recognizing unit recognizing whether the mobile terminal is being charged; the predetermined state is a charging-existence state in which the mobile terminal is recognized by the charging-existence/nonexistence recognizing unit as being charged; and the postilion-measurement-necessity determining unit determines that it is unnecessary to measure the relative position when the mobile terminal is in the charging-existence state.

According to the position measurement system under (7), when the mobile terminal positions near the vehicle in the charging-existence state, the system can presume that the mobile terminal is being charged indoors and there is a low possibility that the user uses the vehicle, and the system can inhibit the measurement of the relative position of the mobile terminal with respect to the vehicle.

(8) The position measurement system according to (7), the mobile terminal having a current position detecting unit, the current position detecting unit detecting a current position of the mobile terminal, the system including an indoor-location recognizing unit that recognizes whether the mobile terminal positions indoors based on the current position of the mobile terminal detected by the current position detecting unit, wherein: the predetermined state is an indoor-charging state, the indoor-charging state being a state in which the mobile terminal is recognized by the charging-existence/nonexistence recognizing unit as being charged and the mobile terminal is recognized by the indoor-location recognizing unit as being located indoors; and the position-measurement-necessity determining unit determines that it is unnecessary to measure the relative position when the mobile terminal is in the indoor-charging state.

According to the position measurement system described under (8), when the mobile terminal positions near the vehicle in the indoor-charging state, the system can presume that there is a low possibility that the user uses the vehicle, and the system can inhibit the measurement of the relative position of the mobile terminal with respect to the vehicle.

(9) The position measurement system according to any one of (1) to (9), the mobile terminal having a motion sensor, the motion sensor detecting a position-change of the mobile terminal, the system including a position-change-existence/nonexistence recognizing unit that recognizes whether the mobile terminal is changed in position based on a detection status of the motion sensor, wherein: the predetermined state is a non-position-change state, the non-position-change state being a state in which the mobile terminal is recognized by the position-change-existence/nonexistence recognizing unit as not being changed in position; and the position-measurement-necessity determining unit determines that it is unnecessary to measure the relative position when the mobile terminal is in the non-position-change state.

According to the position measurement system under (9), when the mobile terminal positions near the vehicle in the non-position-change state, the system can presume that there is a low possibility that the user uses the vehicle, and the system can inhibit the measurement of the relative position of the mobile terminal with respect to the vehicle.

(10) A position measurement method that measures a relative position of a mobile terminal with respect to a vehicle for remote operation of the vehicle with the mobile terminal, the mobile terminal being used by a user of the vehicle to communicate with the vehicle, the method, including: a position-measurement-necessity determination step of determining whether it is necessary to measure the relative position depending on whether the mobile terminal is in a predetermined state when the mobile terminal positions within an out-vehicle communication area of a vehicle communication unit, the vehicle communication unit being provided in the vehicle; and a position measurement control step of causing a position measuring unit to measure the relative position when the position-measurement:-necessity determination step determines that it is necessary to measure the relative position, the position measuring unit being provided in the vehicle.

According to the position measurement method under (10), when the mobile terminal positions within the out-vehicle communication area of the vehicle communication unit, the position-measurement-necessity determination step determines whether it is necessary to measure the relative position of the mobile terminal with respect to the vehicle depending on whether the mobile terminal is in the predetermined state. Then, when the position-measurement-necessity determination step determines that it is necessary to measure the relative position, the position measurement control step causes the position measuring unit to measure the relative position. This can reduce the power consumption as compared with a case where the position measuring unit unconditionally measures the relative position of the mobile terminal with respect to the vehicle when the mobile terminal positions within the out-vehicle communication area of the vehicle communication unit.

(11) A position measurement instruction method that instructs a vehicle to measure a relative position of a mobile terminal with respect to the vehicle for remote operation of the vehicle with the mobile terminal, the method being executed by the mobile terminal, the mobile terminal being used by the user of the vehicle to communicate with the vehicle, the method including: a position-measurement-necessity determination step of determining whether it is necessary to measure the relative position depending on whether the mobile terminal is in a predetermined state when the mobile terminal positions within an out-vehicle communication area of a vehicle communication unit, the vehicle communication unit being provided in the vehicle; and a relative position measurement control step of transmitting position measurement instruction information to the vehicle communication unit when the position-measurement-necessity determination step determines that it is necessary to measure the relative position, the position measurement, instruction information giving an instruction to measure the relative position.

According to the position measurement instruction method under (11), when the mobile terminal positions within the out-vehicle communication area of the vehicle communication unit, the position-measurement-necessity determination step determines whether it is necessary to measure the relative position of the mobile terminal with respect to the vehicle depending on whether the mobile terminal is in the predetermined state. Then, when the position-measurement-necessity determination step determines that it is necessary to measure the relative position, the position measurement control step transmits position measurement instruction information giving an instruction to measure the relative position, to the vehicle communication unit. This enables measurement of the relative position while reducing the power consumption, as compared to a case where the position measurement instruction information is unconditionally transmitted to the vehicle communication unit to give an instruction to measure the relative position when the mobile terminal positions within the out-vehicle communication area of the vehicle communication unit.

(12) A recording medium with position measurement instruction program recorded, the program instructs a vehicle to measure a relative position of a mobile terminal with respect to the vehicle for remote operation of the vehicle with the mobile terminal and the program is executed by a processor provided in the mobile terminal, the mobile terminal being used by the user of the vehicle to communicate with the vehicle, the program causing the processor to function as: a position-measurement-necessity determining unit that determines whether it is necessary to measure a relative position of the mobile terminal with respect to the vehicle, for enabling remote operation of the vehicle with the mobile terminal, depending on whether the mobile terminal is in a predetermined state when the mobile terminal positions within an out-vehicle communication area of a vehicle communication unit, the vehicle communication unit being provided in the vehicle; and a position-measurement control unit that transmits position measurement instruction information to the vehicle communication unit when the position-measurement-necessity determining unit determines that it is necessary to measure the relative position, the position measurement instruction information giving an instruction to measure the relative position.

The processor executes the position measurement instruction program under (12), so that the processor functions as a position-measurement-necessity determining unit and a position-measurement control unit. The position-measurement-necessity determining unit determines whether it is necessary to measure the relative position of the mobile terminal with respect to the vehicle, depending on whether the mobile terminal is in the predetermined state when the mobile terminal positions within the out-vehicle communication area of the vehicle communication unit. Then, when the position-measurement-necessity determining unit determines that it is necessary to measure the relative position, the position-measurement control unit transmits position measurement instruction information giving an instruction to measure the relative position, to the vehicle communication unit. This enables measurement of the relative position while reducing the power consumption, as compared to a case where the position measurement instruction information is unconditionally transmitted to the vehicle communication unit to give an instruction to measure the relative position when the mobile terminal positions within the out-vehicle communication area of the vehicle communication unit.

(13) A vehicle control apparatus, including: a vehicle communication control unit that controls communication of a vehicle communication unit, the vehicle communication unit communicating with a mobile terminal used by a vehicle user; a position measuring unit that measures a relative position of the mobile terminal with respect to the vehicle; a position-measurement-necessity determining unit that receives terminal state information using the vehicle communication control unit via the vehicle communication unit, recognizes whether the mobile terminal is in a predetermined state based on the terminal state information and determines whether to measure the relative position depending on whether the mobile terminal Is in the predetermined state, when the vehicle communication control unit recognizes that the mobile terminal positions within an out-vehicle communication area of the vehicle communication unit, the terminal state information indicating a state of the mobile terminal and being transmitted from the mobile terminal; and a position-measurement control unit that causes the position measuring unit to measure the relative position when the position-measurement-necessity determining unit determines that it is necessary to measure the relative position.

According to the vehicle control apparatus under (13), when the mobile terminal positions within the out-vehicle communication area of the vehicle communication unit, the position-measurement-necessity determining unit recognizes whether the mobile terminal is in the predetermined state based on the terminal state information transmitted from the mobile terminal. Then, the position-measurement-necessity determining unit determines whether to measure the position of the mobile terminal with respect to the vehicle depending on whether the mobile terminal is in the predetermined state. Then, when the position-measurement-necessity determining unit determines that it is necessary to measure the relative position, the position-measurement control unit causes the position measuring unit to measure the relative position. This enables measurement of the relative position while reducing the power consumption, as compared to a case where the position measurement instruction information is unconditionally transmitted to the vehicle communication unit to give an instruction to measure the relative position when the mobile terminal positions within the out-vehicle communication area of the vehicle communication unit.

REFERENCE SIGNS LIST

1: position measurement system, 10: mobile terminal 20: processor (of mobile terminal), 21: mobile communication control unit, 22: terminal lock control unit, 23: operation-existence/nonexistence recognizing unit, 24: charging-existence/nonexistence recognizing unit, 25: position-change-existence/nonexistence recognizing unit, 26: indoor-location recognizing unit, 27: position-measurement-necessity determining unit, 28 position-measurement control unit, 29: mobile electronic key control unit, 40: first mobile communication unit, 41: second mobile communication unit, 50: memory (of mobile terminal), 51: program for control (of mobile terminal), 52: electronic-key-application program, 53: map data, 100: vehicle, 110: ECU, 111: vehicle communication control unit, 112: position measuring unit, 113: vehicle electronic-key control unit, 120: memory (of vehicle), 121: program for control (of vehicle), 130: first vehicle communication unit, 131: BLE antenna, 140: second vehicle communication unit, 141,142,143: UWB antenna

What is claimed is:

1. A position measurement system that includes a vehicle and a mobile terminal used by a user of the vehicle, and that measures a relative position of the mobile terminal with respect to the vehicle for remote operation of the vehicle with the mobile terminal,
the vehicle having a vehicle communication unit and a position measuring unit, the vehicle communication unit communicating with the mobile terminal, the position measuring unit measuring the relative position, the system comprising:
a position-measurement-necessity determining unit that determines whether it is necessary to measure the relative position depending on whether the mobile terminal is in a predetermined state when the mobile terminal positions within an out-vehicle communication area of the vehicle communication unit; and
a position-measurement control unit that causes the position measuring unit to measure the relative position when the position-measurement-necessity determining unit determines that it is necessary to measure the relative position.

2. The position measurement system according to claim 1, wherein:
the position-measurement-necessity determining unit and the position-measurement control unit are provided in the mobile terminal; and
the position-measurement control unit transmits position measurement instruction information to the vehicle communication unit to cause the position measuring unit to measure the relative position, the position measurement instruction information giving an Instruction to measure the relative position.

3. The position measurement system according to claim 1, wherein:
the position-measurement-necessity determining unit and the position-measurement control unit are provided in the vehicle;
the mobile terminal transmits terminal state information to the vehicle communication unit, the terminal state information indicating a state of the mobile terminal; and
the position-measurement-necessity determining unit recognizes whether the mobile terminal is in the predetermined state based on the terminal state information received via the vehicle communication unit.

4. The position measurement system according to claim 1, wherein:
the mobile terminal has a terminal lock control unit, the terminal lock control unit switching from a locked state to an unlocked state in response to a predetermined unlocking operation, the locked state being a state in which the mobile terminal cannot be operated, the unlocked state being a state in which the mobile terminal can be operated;
the predetermined state is the locked state; and
the position-measurement-necessity determining unit determines that it is necessary to measure the relative position when the mobile terminal is in the locked state.

5. The position measurement, system according to claim 1, wherein:
the mobile terminal has an operation-existence/nonexistence recognizing unit, the operation-existence/nonexistence recognizing unit recognizing whether the mobile terminal is being operated;
the predetermined state is a non-operation state in which a situation continues for a predetermined time or longer, the situation being a situation in which the mobile terminal is recognized by the operation-existence/nonexistence recognizing unit as not being operated; and
the position-measurement-necessity determining unit determines that it is necessary to measure the relative position when the mobile terminal is in the non-operation state.

6. The position measurement system according to claim 1, wherein:
the predetermined state is an electronic-key-application operating state in which an electronic key application (app) is in operation in the mobile terminal, the electronic key app causing the mobile terminal to function as an electronic key including a remote operation function of the vehicle; and
the position-measurement-necessity determining unit determines that it is necessary to measure the relative position when the mobile terminal is in the electronic-key-application operating state.

7. The position measurement system according to claim 1, wherein:
the mobile terminal has a charging-existence/nonexistence recognizing unit, the charging-existence/nonexistence recognizing unit recognizing whether the mobile terminal is being charged;
the predetermined state is a charging-existence state in which the mobile terminal is recognized by the charging-existence/nonexistence recognizing unit as being charged; and
the position-measurement-necessity determining unit determines that it is unnecessary to measure the relative position when the mobile terminal is in the charging-existence state.

8. The position measurement system according to claim 7, the mobile terminal having a current position detecting unit, the current position detecting unit detecting a current position of the mobile terminal, the system comprising
an indoor-location recognizing unit that recognizes whether the mobile terminal positions indoors based on the current position of the mobile terminal detected by the current position detecting unit,
wherein: the predetermined state is an indoor-charging state, the indoor-charging state being a state in which the mobile terminal is recognized by the charging-existence/nonexistence recognizing unit as being charged and the mobile terminal is recognized by the indoor-location recognizing unit as being located indoors; and
the position-measurement-necessity determining unit determines that it is unnecessary to measure the relative position when the mobile terminal is in the indoor-charging state.

9. The position measurement system according to claim 1, the mobile terminal having motion sensor, the motion sensor detecting a position-change of the mobile terminal, the system comprising
a position-change-existence/nonexistence recognizing unit that recognizes whether the mobile terminal is changed in position based on a detection status of the motion sensor,
wherein: the predetermined state is a non-position-change state, the non-position-change state being a state in which the mobile terminal is recognized by the position-change-existence/nonexistence recognizing unit as not being changed in position; and
the position-measurement-necessity determining unit determines that it is unnecessary to measure the relative position when the mobile terminal is in the non-position-change state.

10. A position measurement method that measures a relative position of a mobile terminal with respect to a vehicle for remote operation of the vehicle with the mobile terminal, the mobile terminal being used by a user of the vehicle to communicate with the vehicle, the method comprising:
a position-measurement-necessity determination step of determining whether it is necessary to measure the relative position depending on whether the mobile terminal is in a predetermined state when the mobile terminal positions within as out-vehicle communication area of a vehicle communication unit, the vehicle communication unit being provided in the vehicle; and
a position measurement control step of causing a position measuring unit to measure the relative position when the position-measurement-necessity determination step determines that it is necessary to measure the relative position, the position measuring unit being provided in the vehicle.

11. A position measurement instruction method that instructs a vehicle to measure a relative position of a mobile terminal with respect to the vehicle for remote operation of the vehicle with the mobile terminal, the method being executed by the mobile terminal, the mobile terminal being used by a user of the vehicle to communicate with the vehicle, the method comprising:
a position-measurement-necessity determination step of determining whether it is necessary to measure the relative position depending on whether the mobile terminal is in a predetermined state when the mobile terminal positions within an out-vehicle communication area of a vehicle communication unit, the vehicle communication unit being provided in the vehicle; and
a relative position measurement control step of transmitting position measurement instruction information to the vehicle communication unit when the position-measurement-necessity determination step determines that it is necessary to measure the relative position, the position measurement instruction information giving an instruction to measure the relative position.

12. A recording medium with position measurement instruction program recorded, the program instructs a vehicle to measure a relative position of a mobile terminal with respect to the vehicle for remote operation of the vehicle with the mobile terminal and the program is executed by a processor provided in the mobile terminal, the mobile terminal being used by the user of the vehicle to communicate with the vehicle,
the program causing the processor to function as:
a position-measurement-necessity determining unit that determines whether it is necessary to measure a relative position of the mobile terminal with respect to the vehicle, for enabling remote operation of the vehicle with the mobile terminal, depending on whether the mobile terminal is in a predetermined state when the mobile terminal positions within an out-vehicle communication area of a vehicle communication unit, the vehicle communication unit being provided in the vehicle; and a position-measurement control unit, that transmits position measurement instruction information to the vehicle communication unit when the position-measurement-necessity determining unit determines that it is necessary to measure the relative position, the position measurement instruction information giving an instruction to measure the relative position.

13. A vehicle control apparatus, comprising:
a vehicle communication control unit that controls communication of a vehicle communication unit, the vehicle communication unit communicating with a mobile terminal used by a vehicle user;
a position measuring unit that measures a relative position of the mobile terminal with respect to the vehicle;
a position-measurement-necessity determining unit that receives terminal state information using the vehicle communication control unit via the vehicle communication unit, recognizes whether the mobile terminal is in a predetermined state based on the terminal state information and determines whether to measure the relative position depending on whether the mobile terminal is in the predetermined state, when the vehicle communication control unit recognizes that the mobile terminal positions within an out-vehicle communication area of the vehicle communication unit, the terminal state information indicating a state of the mobile terminal and being transmitted from the mobile terminal; and
a position-measurement control unit that, causes the position measuring unit to measure the relative position when the position-measurement-necessity determining unit determines that it is necessary to measure the relative position.

\* \* \* \* \*